Nov. 1, 1960 H. EMMERICH 2,958,155

PORTABLE SPRAYING APPARATUS

Filed Dec. 28, 1955

INVENTOR

Heinz Emmerich

BY

By Michael S. Striker

Agt.

United States Patent Office 2,958,155

Patented Nov. 1, 1960

2,958,155

PORTABLE SPRAYING APPARATUS

Heinz Emmerich, Stuttgart, Germany, assignor to Firma Kleinmotoren G.m.b.H., Maichingen, Germany Filed Dec. 28, 1955, Ser. No. 555,959

Claims priority, application Germany Dec. 28, 1954

11 Claims. (Cl. 43—148)

The present invention relates to a portable spraying apparatus and more particularly to a portable spraying apparatus for spraying insecticides.

One object of the present invention is to provide a spraying apparatus in which a large output is combined with low weight.

It is a further object of the present invention to arrange the essential elements of the spraying apparatus that is the motor, the blower, the container for the material to be sprayed and any other necessary container on a support to form a compact overall unit.

An additional object of the present invention is to arrange the blower of the unit in relationship to the motor in such a way that the air sucked in by the blowers serves at the same time to cool the motor.

It is yet a further object of the present invention to form the support for carrying the apparatus in such a way that the apparatus can be carried conveniently on the back of the user, and be also safely placed on the ground.

It is another object of the present invention to form the support in such a way that all moving parts of the apparatus are protected.

It is yet a further object of the present invention to arrange the containers carried on the support in such a way that they can be removed easily and be exchanged against different containers.

With the above objects in view the present invention mainly consists in a portable spraying apparatus comprising, in combination, a support, drive means mounted on the support, the drive means including a drive shaft, a blower mounted on the support on one side of the drive means and including a driven shaft transversely spaced from the drive shaft, transmission means connecting the drive shaft with the driven shaft for rotating the latter, a closed container carried by the support adjacent the drive means on the other side thereof and adapted to contain a substance to be sprayed, conduit means connecting the blower with the container for increasing the air pressure in the latter, and spraying means connected to the container for spraying the substance.

The drive means for the spraying apparatus are preferably in the form of an internal combustion engine having an air-cooled cylinder and the suction opening of the blower is arranged in relation to this air-cooled cylinder in such a way that the air sucked into the blower cools the cylinder of the engine.

Preferably the apparatus includes besides a container adapted to contain the substance to be sprayed at least one additional container for the fuel of the motor and these containers are preferably arranged in abutting relationship and in line with each other on the top of the support and are preferably releasably fastened to the support, so that the container containing the substance to be sprayed may conveniently be changed against another container. When the apparatus is used for the spraying of insecticides, the unit is preferably provided with two exchangeable containers of substantially identical shape. One of the containers is adapted to contain a liquid insecticide to be sprayed whereas the other container is used during spraying of a powdery material. The latter container is preferably formed with a funnel-shaped insert receiving the insecticide powder and an agitating mechanism located in the narrow end of the funnel-shaped insert is provided. In this case transmission means are further provided to drive the agitating mechanism from the drive shaft of the motor. These transmission means are preferably disconnectable to facilitate the exchange of one container for the other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2:
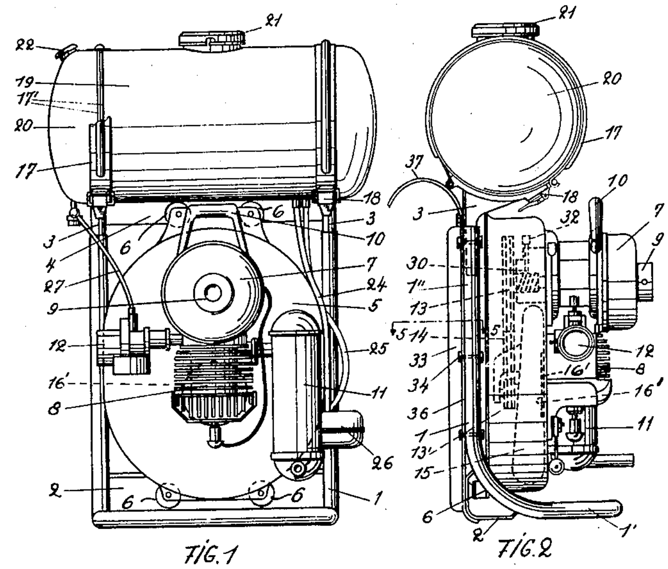
Fig. 1 is a front view of a portable spraying apparatus according to the present invention, provided with a container for spraying a liquid substance.
Fig. 2 is a side view of the apparatus illustrated in Fig. 1.

Referring now to the drawings and more particularly to Figs. 1 and 2 of the same, it will be seen that the portable spraying apparatus is provided with a tubular U-shaped frame member 1 forming part of the support structure of the apparatus. Frame member 1 has a base portion 1' and an upright portion 1'' projecting from one side of the base portion substantially normal to the same. A bracket 2 is fastened in any suitable way, for instance by welding, to the base portion 1' to enlarge the base portion and to stiffen the frame at its lower end. Two support brackets 3 are respectively inserted into the upper open ends of the U-shaped tubular frame member 1 and fastened to the upper ends of the frame member. The support brackets 3 are connected by a cross-member 4 which stiffens the upper end of the U-shaped frame member. A trough-shaped hood member 5 is attached to the members 2 and 4. Dampening members 6 consisting of a resilient material are preferably arranged between the hood member 5 and the frame member 1 or between the hood 5 and the two members 2 and 4, respectively. Located outwardly of the trough-shaped hood member 5 and fastened thereto are drive means, shown as a small internal combustion engine having a crank case 7 and an air cooled cylinder 8. The engine shaft carries on one end a starter wheel 9. Fastened to the crank case 7 is a carrying handle 10. A muffler 11 is connected to one side of the engine and a carburetor 12 to its other side. The shaft of the motor extends into the hood member 5 and carries keyed to its end a large pulley 13 which drives over a V-belt 14 a small pulley 13' keyed to the shaft of the blower 15. Thereby blower 15 is driven at a greater speed than the speed of the shaft of the combustion engine. Instead of using a V-belt transmission 14, 13, 13' for driving the blower, any other transmission means for instance a gear transmission, could also be used. The blower 15 is fastened to the hood member 5 and located in relation to the combustion engine in such a way that the suction opening 16 of the blower is located behind the cylinder 8 of the combustion engine. The hood member 5 is also provided with an opening 16' in line with the suction opening 16 of the blower so that the air stream sucked in by the blower cools at the same time the cylinder 8 of the motor.

Fastened to the support bracket 3 are releasable fastening means which comprise retaining straps 17 which are at one end thereof fixedly attached to the support brackets 3 and on the other end releasably attached to the support brackets 3 by releasable quick-acting connecting means 18. Carried by the support brackets 3 is a closed container 19, which, in the preferred form illustrated in the drawings, is of cylindrical shape. Arranged next to the container 19 is a second container 20, which, in the preferred form shown in the drawings, is also of cylindrical shape and has a cross-section equal to the cross-section of the container 19. The containers 19 and 20 are arranged in abutting relationship and the abutting faces of the two containers are located under one of the retaining straps 17. To hold the two end faces of the containers securely against each other, the end faces are each provided with an annular rim 17' projecting beyond the cylindrical surfaces of the containers, and the retaining strap 17 has a groove engaging the annular rims 17' of the two abutting containers. Each of the containers 19 and 20 is provided with filling openings which are respectively closed by closure caps 21 and 22.

Figures 3, 4, 5, 6, 7:
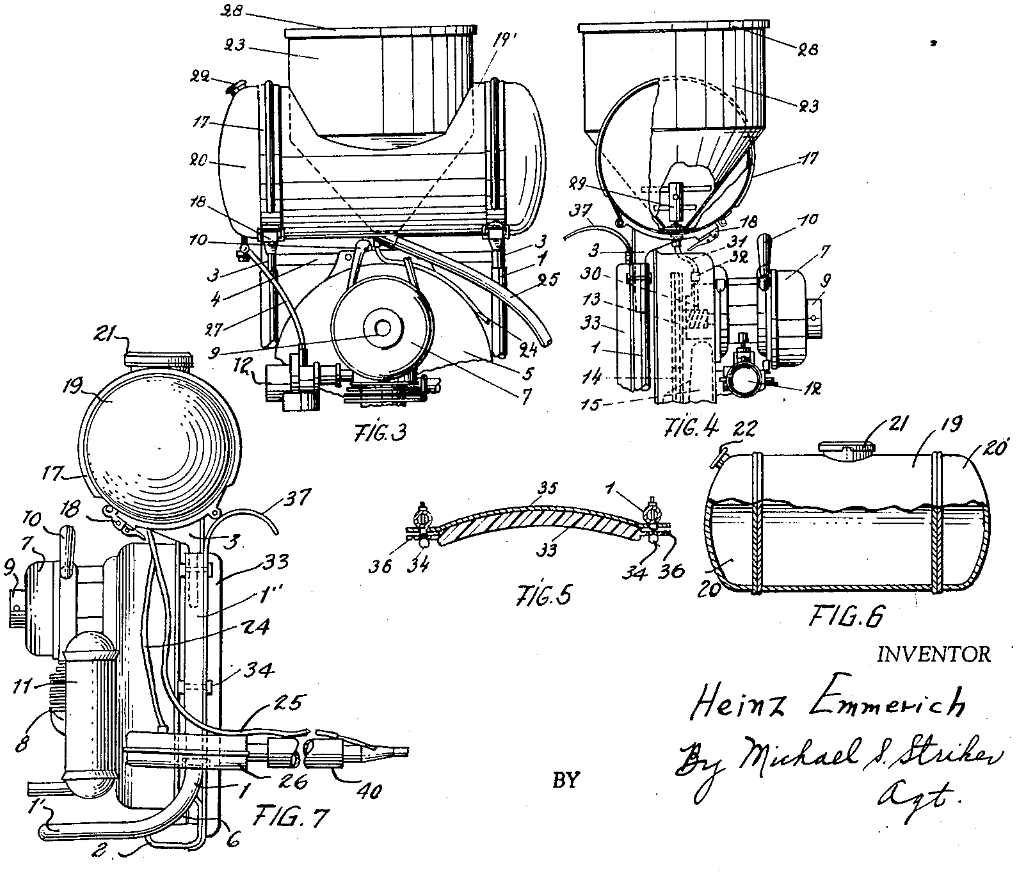
Fig. 3 is a partial front view of a modification of the apparatus showing a container adapted to contain a powdery substance.
Fig. 4 is a side view of the modification shown in Fig. 3 with parts broken away to show the agitating mechanism in the container.
Fig. 5 is a cross-section taken along the lines 5—5 of Fig. 2 in the direction of the arrows.
Fig. 6 is a partly sectional view showing a modification of the container shown in Fig. 1.
Fig. 7 is a side view similar to Fig. 2 but showing the opposite side of the apparatus.

The portion of the container 19 extending on the right side (as seen in Fig. 1) beyond the retaining strap 17 may also be formed as a separate container 20' as shown in Fig. 6. Such a container would be used for carrying water, tools or any other necessary materials.

The apparatus of the present invention is especially used for spraying insecticides, which may be in the form of a liquid or in the form of a powder. In order to adapt the spraying apparatus to any of these two types of materials, the container 19 adapted to contain a liquid material can be easily exchanged for a container adapted to contain a powdery material. A container 19' for powdery material is illustrated in the Figs. 3 and 4. Container 19' shown in Fig. 3 has the same basic cylindrical shape as the container 19 shown in Fig. 1 and is provided with a funnel-shaped insert 23 which is tightly closed on its upper end by a cover member 28. An agitating mechanism 29 is provided on the narrow end of the funnel-shaped insert 23 to facilitate the flow of the powdery material. To drive the agitating mechanism 29 transmission means are provided connecting the drive shaft of the motor with the agitating mechanism 29. These transmission means comprise gear means 30 which may be in the form of a worm and worm gear or in the form of bevel gears. The gear means 30 are connected to the agitating means 29 by a flexible shaft 31. A releasable coupling 32 is further provided so that the flexible shaft 31 may be disconnected from the gear means 30 whenever the container 19' is exchanged for a container 19.

A tubular conduit means 24 leading from the blower 15 into the containers 19 or into the funnel-shaped insert of container 19', respectively, is provided for increasing the air pressure in the containers. To make an exchange of the containers possible, the upper end of the tube 24 is releasably connected to the container. A second conduit means 25 leads from the inside of the container 19 or from the funnel-shaped insert of container 19' to the spraying nozzle 40 which is fastened to the end of the spray pipe 26. Conduit means 25, spray pipe 26 and the spraying nozzle 40 form the spraying means of the apparatus. The container 20 serving to contain the fuel for the motor is connected by means of a conduit means 27 to the carburetor 12 of the motor.

For the convenience of the user, the apparatus is provided with a backrest, comprising a cushion 33 fastened to the two upright legs 1'' of the U-shaped frame member 1 by means of fastening bolts 34. To prevent excessive curving of the cushion, a support base is also provided which consists of flexible non-yielding material, for instance of steel bands 35. Steel bands 35 extend between the upright legs 1'' of the frame member 1 and are fastened thereto by the bolts 34. Cushion 33 is preferably releasably fastened to the bolts 34 and straps 36 are provided for this purpose, as shown in Fig. 5. Straps 36 are formed with eyelets which can be snapped over the rounded ends of the bolts 34. The apparatus is carried on the back by means of carrying straps 37. Only the upper ends which are fixedly secured to the support frame 1 are shown in the drawings and the lower ends of these carrying straps 34 are secured to the bottom of the carrying frame in any suitable releasable manner.

The portable spraying apparatus as described will operate as follows:

The combustion engine of the machine is started preferably with the apparatus resting on the ground on the support base 1' and on the stiffening member 2. The blower is rotated at a speed higher than the speed of the shaft of motor and compressed air is supplied through the conduit 24 to the containers 19 or to the funnel-shaped insert 23 of the conatiner 19' respectively, containing the material to be sprayed. The air sucked in by the blower cools at the same time the cylinder 8 of the engine. The material to be sprayed leaves the container through the conduit 25 and is sprayed by the spraying nozzle 40 located at the end of the spray pipe 26. The necessary fuel for driving the motor is supplied to the carburetor 12 of the same through the conduit 27 connecting the carburetor 12 with the fuel tank 20. If it is desired to spray an object with powdery insecticide, the container 19 is removed from the support frame 1 by releasing the fastening means 17 and by exchanging the container 19 for the container 19' which contains powdery substance. The agitating mechanism 29 located in the funnel-shaped insert 23 of the container 19' is operated by means of the flexible shaft 31 connected to the gear means on the shaft of the drive motor by the coupling 32.

It will be understood that each of the elements described above, or two or more together, may also find a useful application in other types of portable spraying apparatuses differing from the types described above.

While the invention has been illustrated and described as embodied in a portable spraying apparatus adapted for spraying of insecticides, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A portable spraying apparatus comprising, in combination, a support; an internal combustion engine having an air cooled cylinder and a drive shaft and being mounted on said support; a blower mounted on said support on one side of said engine and having a driven shaft transversely spaced from said drive shaft and a suction opening located adjacent to and facing said cylinder so that the air stream sucked through said suction opening into said blower cools said cylinder; transmission means connecting said drive shaft with said driven shaft for rotating the latter; a closed container carried by said support adjacent said engine on the other side thereof and adapted to contain a substance to be sprayed; conduit means connecting said blower with said container for increasing the air pressure in the latter; and spraying means operatively connected to said container for spraying said substance.

2. A portable spraying apparatus comprising, in combination, a support including a frame member having a base portion and an upright portion projecting from one side of the base portion substantially normal thereto, and a hood member attached to said upright portion; an internal combustion engine having an air cooled cylinder and being mounted on said hood member substantially outside of the same, said engine having a drive shaft extending into said hood member; a blower mounted inside said hood member on one side of said engine and having a driven shaft transversely spaced from and parallel to said drive shaft, said blower having a suction opening located adjacent to said cylinder and said hood member being provided with an opening therethrough in line with said suction opening so that the air stream sucked into said blower cools said cylinder; transmission means connecting said drive shaft with said driven shaft for rotating the latter; a closed container carried by said frame member adjacent said engine on the other side thereof and adapted to contain a substance to be sprayed; conduit means connecting said blower with said container for increasing the air pressure in the latter; and spraying means operatively connected to said container for spraying said substance.

3. A portable spraying apparatus comprising, in combination, a support including a frame member having a base portion and an upright portion projecting from one side of the base portion substantially normal thereto, and a hood member attached to said upright portion; an internal combustion engine having a crank case and an air cooled cylinder extending from said crank case toward said base portion of said frame member and being mounted on said hood member substantially outside of the same, said engine having a drive shaft extending into said hood member; a blower mounted inside said hood member between said engine and said base portion and having a driven shaft transversely spaced from and parallel to said drive shaft, said blower being provided with a suction opening located adjacent to said cylinder and said hood member being formed with an opening therethrough in line with said suction opening so that the air stream sucked into said blower cools said cylinder; transmission means connecting said drive shaft with said driven shaft for rotating the latter; a closed container mounted on the free end of said upright portion of said frame member opposite the base portion thereof and adapted to contain a substance to be sprayed; conduit means connecting said blower with said container for increasing the air pressure in the latter; and spraying means operatively connected to said container for spraying said substance.

4. A portable spraying apparatus comprising, in combination, a support including a tubular U-shaped frame member having a base portion and an upright portion provided with two substantially parallel legs projecting from one side of the base portion substantially normal thereto, a back rest fastened to and extending between said two legs of said upright portion, a pair of support brackets mounted on the free ends of said upright portion, and a hood member attached to said upright portion; an internal combustion engine having a crank case and an air cooled cylinder extending from said crank case toward said base portion of said frame member and being mounted on said hood member substantially outside of the same, said engine having a drive shaft extending into said hood member; a blower mounted inside said hood member between said engine and said base portion and having a driven shaft transversely spaced from and parallel to said drive shaft, said blower being provided with a suction opening located adjacent to said cylinder and said hood member being formed with an opening therethrough in line with said suction opening so that the air stream sucked into said blower cools said cylinder; transmission means connecting said drive shaft with said driven shaft for rotating the latter; a closed container mounted on the free end of said upright portion of said frame member opposite the base portion thereof carried by said support brackets and adapted to contain a substance to be sprayed; conduit means connecting said blower with said container for increasing the air pressure in the latter; and spraying means operatively connected to said container for spraying said substance.

5. A portable spraying apparatus comprising, in combination, a support including a tubular U-shaped frame member having a base portion and an upright portion provided with two substantially parallel legs projecting from one side of the base portion substantially normal thereto, a backrest fastened to and extending between said two legs of said upright portion, a pair of support brackets mounted on the free ends of said upright portion and a hood member attached to said upright portion; an internal combustion engine having a crank case and an air cooled cylinder extending from said crank case toward said base portion of said frame member and being mounted on said hood member substantially outside of the same, said engine having a drive shaft extending into said hood member; a blower mounted inside said hood member between said engine and said base portion and having a driven shaft transversely spaced from and parallel to said drive shaft, said blower being provided with a suction opening located adjacent to said cylinder and said hood member being formed with an opening therethrough in line with said suction opening so that the air stream sucked into said blower cools said cylinder; transmission means connecting said drive shaft with said driven shaft for rotating the latter; a first closed cylindrical container adapted to contain a substance to be sprayed; a second closed cylindrical container adapted to contain the fuel for said engine, said two containers mounted coaxial with each other in end to end relationship on said support brackets; releasable fastening means for releasably fastening said containers to said support brackets; conduit means connecting said blower with said first container for increasing the air pressure in the latter; conduit means connecting said engine with said second container; and spraying means operatively connected to said first container for spraying said substance.

6. A portable spraying apparatus comprising, in combination, a support including a tubular U-shaped frame member having a base portion and an upright portion provided with two substantially parallel legs projecting from one side of the base portion substantially normal thereto, a backrest fastened to and extending between said two legs of said upright portion, a pair of support brackets mounted on the free ends of said upright portion and a hood member attached to said upright portion; an internal combustion engine having a crank case and an air cooled cylinder extending from said crank case toward said base portion of said frame member and being mounted on said hood member substantially outside of the same, said engine having a drive shaft extending into said hood member; a blower mounted inside said hood member between said engine and said base portion and having a driven shaft transversely spaced from and parallel to said drive shaft, said blower being provided with a suction opening located adjacent to said cylinder and said hood member being formed with an opening therethrough in line with said suction opening so that the air stream sucked into said blower cools said cylinder; transmission means connecting said drive shaft with said driven shaft for rotating the latter; a first closed cylindrical container including a funnel-shaped insert adapted to contain a powdery substance to be sprayed; a second closed cylindrical container adapted to contain the fuel for said engine, said two containers mounted coaxial with each other in close relationship on said support brackets; releasable fastening means for releasably fastening said containers to said support brackets; an agitating mechanism located at the narrow end of said funnel-shaped insert; transmision means operatively connected to said drive shaft of said engine and to said agitating mechanism for driving the latter; conduit means connecting said blower with said funnel-shaped insert of said first container for increasing the air pressure in the latter; conduit means connecting said engine with said second container; and spraying means operatively connected to said narrow end of said funnel-shaped insert for spraying said powdery substance.

7. A portable spraying apparatus comprising, in combination, a support including a tubular U-shaped frame member having a base portion and an upright portion provided with two substantially parallel legs projecting from one side of the base portion substantially normal thereto, a backrest fastened to and extending between said two legs of said upright portion, a pair of support brackets mounted on the free ends of said upright portion and a hood member attached to said upright portion; an internal combustion engine having a crank case and an air cooled cylinder extending from said crank case toward said base portion of said frame member and being mounted on said hood member substantially outside of the same, said engine having a drive shaft extending into said hood member; a blower mounted inside said hood member between said engine and said base portion and having a driven shaft transversely spaced from and parallel to said drive shaft, said blower being provided with a suction opening located adjacent to said cylinder and said hood member being formed with an opening therethrough in line with said suction opening so that the air stream sucked into said blower cools said cylinder; transmission means connecting said drive shaft with said driven shaft for rotating the latter; a first closed cylindrical container including a funnel-shaped insert adapted to contain a powdery substance to be sprayed; a second closed cylindrical container adapted to contain the fuel for said engine, said two containers mounted coaxial with each other in close relationship on said support brackets; releasable fastening means for releasably fastening said containers to said support brackets; an agitating mechanism located at the narrow end of said funnel-shaped insert; transmission means connecting said drive shaft of said engine with said agitating mechanism for driving the latter, said transmission means including gear means operatively connected to said drive shaft, a flexible shaft connected to said agitating mechanism and releasable coupling means connecting said gear means with said flexible shaft so that said flexible shaft may be disconnected from said gear means when said first container is removed from said brackets; conduit means connecting said blower with said funnel-shaped insert of said first container for increasing the air pressure in the latter; conduit means connecting said engine with said second container; and spraying means operatively connected to said narrow end of said funnel-shaped insert for spraying said powdery substance.

8. A portable insecticide spraying apparatus comprising, in combination, a support including a tubular U-shaped frame member having a base portion and an upright portion provided with two substantially parallel legs projecting from one side of the base portion substantially normal thereto, a backrest fastened to and extending between said two legs of said upright portion, a pair of support brackets mounted on the free ends of said upright portion and a hood member attached to said upright portion; an internal combustion engine having a crank case and an air cooled cylinder extending from said crank case toward said base portion of said frame member and being mounted on said hood member substantially outside of the same, said engine having a drive shaft extending into said hood member; a blower mounted inside said hood member between said engine and said base portion and having a driven shaft transversely spaced from and parallel to said drive shaft, said blower being provided with a suction opening located adjacent to said cylinder and said hood member being formed with an opening therethrough in line with said suction opening so that the air stream sucked into said blower cools said cylinder; transmission means connecting said drive shaft with said driven shaft for rotating the latter; a first closed container adapted to contain a liquid insecticide to be sprayed; at least one additional closed container adapted to contain fuel for said engine, said containers having substantially equal cross sections and being mounted aligned and in abutting relationship with each other on said support bracket; releasable fastening means for releasably fastening said containers to said support brackets whereby said first container may be exchanged against another container adapted to contain an insecticide powder to be sprayed; conduit means connecting said blower with said first container for increasing the air pressure in the latter; conduit means connecting said engine with said one container; and spraying means operatively connected to said first container for spraying said substance.

9. A portable spraying apparatus comprising, in combination, a support including a tubular-U-shaped frame member having a base portion and an upright portion provided with two substantially parallel legs projecting from one side of the base portion substantially normal thereto, a backrest fastened to and extending between said two legs of said upright portion, a pair of support brackets mounted on the free ends of said upright portion, and a hood member attached to said upright portion; an internal combustion engine having a crank case and an air cooled cylinder extending from said crank case toward said base portion of said frame member and being mounted on said hood member substantially outside of the same, said engine having a drive shaft extending into said hood member; a blower mounted inside said hood member between said engine and said base portion and having a driven shaft transversely spaced from and parallel to said drive shaft, said blower being provided with a suction opening located adjacent to said cylinder and said hood member being formed with an opening therethrough in line with said suction opening so that the air stream sucked into said blower cools said cylinder; transmission means connecting said drive shaft with said driven shaft for rotating the latter; a first closed container adapted to contain a substance to be sprayed; a pair of closed containers each having a cross section substantially equal to the cross section of said first container and being arranged in line and in abutting relationship respectively on opposite sides of said first container, one of said containers of said pair of containers adapted to contain fuel for said engine, the abutting faces of said containers being each formed with an annular rim projecting beyond said faces; releasable fastening means comprising a pair of retaining straps attached respectively at one end fixedly and on the other end by releasable quick-acting connecting means to said support brackets and being tightly wound about said rims of said containers, respectively, for releasably fastening said containers to said support brackets; conduit means connecting said blower with said first container for increasing the air pressure in the latter; conduit means connecting said engine with said one container; and spraying means operatively connected to said first container for spraying said substance.

10. A portable spraying apparatus as defined in claim 4, wherein said backrest comprises a support base being formed from flexible non-yielding material and being fastened to and extending between the two legs of said upright portion; and a cushion abutting against said support base and fastened to said two legs.

11. A portable spraying apparatus comprising, in combination, support means including a tubular U-shaped frame member having a base portion and an upright portion provided with two substantially parallel legs projecting from one side of the base portion substantially normal thereto, a back rest fastened to and extending between said two legs of said upright portions, a hood member fastened to the upright portion of said frame member, and a pair of support brackets mounted on the free ends of said upright portion; drive means mounted on said hood member substantially outside the same and having a drive shaft extending into said hood member; a blower mounted inside said hood member spaced from said back rest and having a driven shaft substantially parallel and laterally spaced from said drive shaft; transmission means located inside said hood member and operatively connected to said drive means and said blower for driving said blower by said drive means; a closed container carried by said support brackets and adapted to contain a substance to be sprayed; conduit means connecting said blower with said container for increasing the air pressure in the latter; and spraying means operatively connected to said container for spraying said substance.

References Cited in the file of this patent

UNITED STATES PATENTS

| | | |
|---|---|---|
| 1,394,686 | Redmon | Oct. 25, 1921 |
| 1,427,743 | Lang | Aug. 29, 1922 |
| 1,557,106 | Tow et al. | Oct. 13, 1925 |
| 1,561,039 | Walker | Nov. 10, 1925 |
| 2,521,313 | Sproat | Sept. 5, 1950 |
| 2,596,473 | Essick | May 13, 1952 |
| 2,634,165 | Murphy | Apr. 7, 1953 |
| 2,740,230 | Clapper | Apr. 3, 1956 |
| 2,803,085 | Walberg | Aug. 20, 1957 |